July 25, 1933.  A. L. CASH  1,919,930
CONTROL MECHANISM FOR MOTOR VEHICLES
Filed July 18, 1932
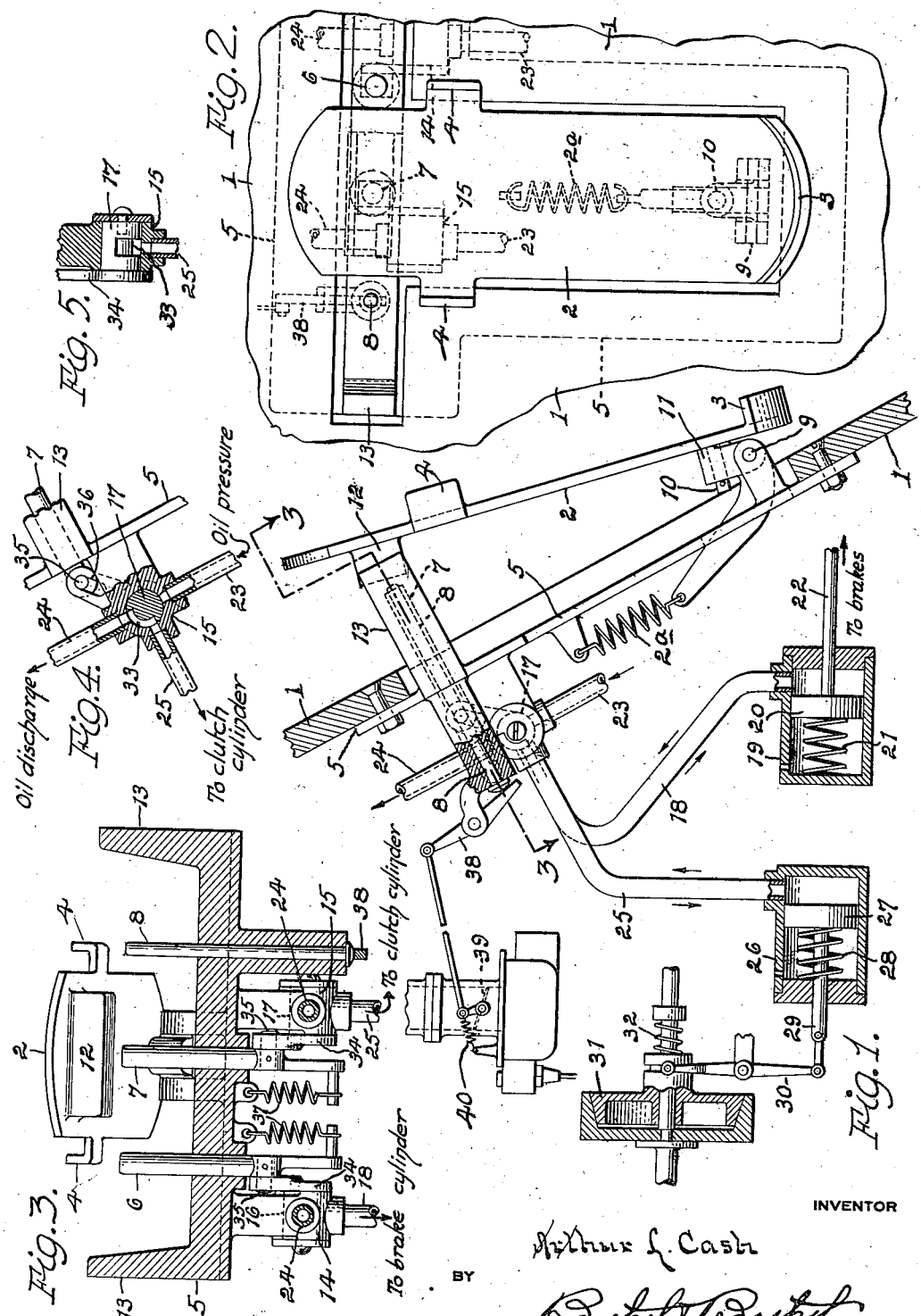

Patented July 25, 1933

1,919,930

UNITED STATES PATENT OFFICE

ARTHUR L. CASE, OF MARINE CITY, MICHIGAN

CONTROL MECHANISM FOR MOTOR VEHICLES

Application filed July 18, 1932. Serial No. 623,180.

This invention relates to means for controlling the several devices and mechanisms of a motor vehicle, such as the engine, the engine clutch, the brakes, etc., in proper sequence, and certain of said mechanisms simultaneously, or separately, to cause these several devices to function properly in the operation of the vehicle, and an object of invention is to simplify the control and operation of such vehicles and to insure against mistakes or abuses in the operation, in proper sequence, of the several devices.

A further object is to provide such a control mechansim embodying a single foot pedal, whereby the operation of controlling the several devices and mechanisms is simplified and made certain by obviating the necessity on the part of the driver, for transferring his foot from one pedal to another with the consequent danger of pressing the wrong pedal, having his foot slip, or not having his foot in proper position at all times to operate such control mechanism.

It is also an object to provide a control mechanism which is simple in construction, and which embodies certain other new and useful features in the construction, arrangement, and combination of parts, all as hereinafter set forth and more particularly pointed out in the appended claims, reference being had to the accompanying drawing in which;

Figure 1 is a sectional side elevation of operating mechanism illustrative of an embodiment of the invention and showing, diagrammatically, its connection with the several devices or mechanisms controlled thereby;

Fig. 2 is a front elevation of Fig. 1;

Fig 3 is a section substantially upon the line 3—3 of Fig. 1;

Fig. 4 is a detail, partly in section, of a control valve; and

Fig. 5 is a longitudinal section of the valve shown in Fig. 4.

In the drawing, 1 indicates the usual inclined toe boards of a motor vehicle and through which, as usually arranged, three or more foot operated members, such as a clutch pedal, a brake pedal and an accelerator member extend to be separately operated by pressure thereon of the driver's foot, these members being separately operated by transferring the foot from one to the other. In the present arrangement, but one foot pedal, indicated as a whole by the numeral 2, is provided, this being a broad flat plate having a curve end flange 3 against which the heel of the driver's shoe is adapted to rest, and having side flanges 4 near its opposite end to engage the sides of the sole of the driver's shoe. When placed upon this pedal, the driver's foot is held by said flanges against slipping, and as the arrangement is such that it is never necessary, in order to operate the several controls, to remove the foot from this pedal, the several controls are always under direct control by the driver's foot.

Mounted for longitudinal movement within suitable bearings formed integral with a mounting plate 5 secured in any suitable manner, to the under side of the toe board 1, are three pins 6, 7 and 8 and over the upper projecting ends of which the toe portion of the pedal plate 2 is adapted to swing. it being normally held elevated by a spring 2a, said pedal being mounted against its heel portion, upon the mounting plate 5. for pivotal movement upon a horizontal pivot 9 and for lateral swinging movement, by an upwardly extending pin 10 passing through a bearing hole therefore, in a pivot member 11 which is mounted between ears on said mounting plate, by the pivot 9.

This foot pedal or plate 2 may thus be depressed or turned toward the toe board to bring a lug 12 on the under side of its toe portion into engagement with one or more of said pins, depending upon the position of said pedal when it is depressed. this lug being long enough to span the space between two adjacent pins and move both pins when said pedal is swung laterally to the proper position. When in mid position as shown, the pedal is in position to move the center pin only. and by swinging it laterally from that mid position to position over this and an adjacent pin, both pins 6 and 7 may be moved, and by swinging said pedal laterally in the same direction to the limit of such swinging movement as determined by a stop lug 13 projecting upwardly from the mounting plate 5, the pin 6 alone may be rotated. By swinging the pedal laterally to the limit of its movement as determined by a like stop lug at the other side of the pedal, the pin 8 may be moved independently of the others.

Lugs projecting downwardly from the lower side of the plate 5 are formed at their lower ends into cylinders or casings 14 and 15 to receive rotary valves 16 and 17 and from the valve casing 14 of the valve 16, a pipe 18 leads to a fluid cylinder 19 having a piston 20 therein adapted to be moved in one direction by oil pressure entering said cylinder through said pipe 18 and to be moved in the opposite direction when oil pressure is relieved, by a spring 21. This piston 20 has a piston rod 22 which is connected to the usual brake operating mechanics, (not shown) for operating the usual brakes in connection with the road wheels of the vehicle. From the lower side of this valve casing 14, a pipe 23 leads to a suitable source of oil under pressure, such as the usual oil pump (not shown) or an oil reservoir under pressure, and from the upper side of said casing 14, an oil return pipe 24 leads to said pump to return the oil thereto. In a like manner, oil under pressure is fed to the valve casing or cylinder 15 from said oil pump by a like pipe 23 and is returned to said pump through a pipe 24.

The valve casing 15 has a pipe 25 leading therefrom to a cylinder 26 having a piston 27 therein operated in one direction by oil under pressure from said pipe 25, and in the opposite direction, when the pressure is removed, by a spring 28. This piston has a piston rod 29, the outer end of which is connected by suitable linkage to a lever 30 for throwing out the usual engine clutch 31 against the action of the usual spring 32.

As shown in Fig. 4, the valve 17 has a port 33 therein adapted to connect the pipe 25 with the pipe 24 when turned to one position or to connect said pipe 25 with the pipe 23, when turned to another position. In a like manner the valve 16 has a port 33 adapted to connect the pipe 18 with the pipe 24, when in one position and to connect the said pipe 18 with the pipe 23 when in another position.

Each valve 16 and 17 has a crank arm 34 at one end, each of which arms is pivotally attached to the lower end of one of the pins 6, 7 by a pivot pin 35 engaged within a longitudinal slot 36 in one of the crank arms. Each of the bell cranks 34 is normally held turned to project the pin 6 or 7 to which it is connected, upwardly, by a spring 37.

The pin 8 is arranged to be moved longitudinally by the pedal 2 to bring a head on its lower end into engagement with the end of a pivoted lever 38, to the opposite end of which lever is pivotally attached a rod leading to the throttle valve 39 of the vehicle engine, said throttle being turned against the push of the rod 8, by a spring 40 which tends to normally hold the throttle closed or in idling position. Therefore by swinging the pedal 2 laterally to a position over the pin 8, the engine throttle may be operated by the foot pedal independently of the other pins 6 and 7 to accelerate the engine at will.

When said control pedal is in mid position as shown, it is out of contact with the accelerate pin 8, and the engine is decelerated or idle. With the control pedal in this position and out of contact with the clutch control pin 7, the valve 17 is held turned by its spring 37 to a position where its port 33 affords free communication between the pipe 25 leading to the cylinder 26 for operating the engine clutch 31 and the oil return or discharge pipe 24. Oil pressure in the cylinder 26 is thus relieved and the spring 32 will be free to act, holding the clutch in or engaged. The parts are therefore in running position, the brakes being off and the clutch in, to transmit driving power from the engine to drive the vehicle. In this position, pressure on the foot pedal will move the pin 7, rotating the valve 17 to connect the oil pressure line 23 with the line 25, admitting pressure to the cylinder 26 and thus throwing out the clutch.

By moving the foot pedal into position to engage both the clutch pin 7 and the brake pin 6, and then depressing the pedal the clutch will be thrown out in the manner described, and the brake will be simultaneously set as the turning of the valve 16 will bring its port 33 into position to connect the oil pressure line 23 with the line 18 leading to the cylinder 19 to admit oil under pressure thereto and operate the piston 20 to set the brakes, but a further lateral movement of the foot pedal in the same direction, will bring it into position to operate the brake pin alone, and a depression of the pedal will then operate to turn the valve 16 only to bring its port into position to connect the oil pressure line 23 and brake line 18 to set the brakes.

With this arrangement, the accelerator alone may be operated when the pedal is swung to the limit of its movement in one direction and when swung to its limit in the opposite direction, the brakes only will be operated upon depression of said pedal. When said pedal is out of contact with all of the operating pins 6, 7 and 8, both oil pressure lines 23 are closed, and there is therefore no pressure in either the brake line 18 or the clutch line 25 and therefore the brakes are off and the clutch is in, placing the parts in condition for forward driving of the vehicle. By placing the foot pedal in mid position out of contact with the accelerator pin, the engine is automatically decelerated, and by then depressing the pedal, the clutch pin will alone be operated and the clutch thrown out, thereby placing the vehicle in "free wheeling" condition, the engine being decelerated, the brakes off and the clutch out to give free coasting conditions. However, should an emergency arise during the "free wheeling" position, releasing of the pedal will immediately throw the clutch in, thus bringing in the idling engine as a braking factor, and then by shifting the pedal into position to engage both clutch and brake pins, the clutch may be thrown out and the brakes set, or if desired, by shifting to engage the brake pin only, the brakes may be set, with the clutch in and the engine idling.

With this arrangement any driving condition which may be secured with the usual arrangement of separately operated foot pedals and accelerator, may be had through the operation of the single pedal, with the added advantage that the engine will necessarily be decelerated whenever either the clutch or brakes, or both clutch and brakes are operated. Therefore the danger of injury to these parts or to the parts of the transmission mechanism by operation with the engine accelerated, is obviated, and further, mistakes in operation of clutch or brakes at the wrong time, which mistakes might cause injury to the mechanisms, is obviated as all devices are at all times placed automatically in such condition that such injury cannot occur. Under certain conditions it is advisable to be able to throw out the clutch and simultaneously put on the brakes, and this may be accomplished by bringing the single pedal into position to operate both pins 6 and 7.

Obviously changes may be made in the construction and arrangement of parts without departing from the spirit of my invention, and I do not, therefore, limit myself to the particular construction shown.

Having thus fully described my invention what I claim is:

1. In a device for controlling the operation of the brakes, the clutch and the engine speed control means of a motor vehicle, the combination with a clutch control member, a brake control member and an engine speed control member, of a single operating member adapted to be moved to operate each of said members independently of the others.

2. In a device for controlling the operation of the brakes, the clutch and the engine speed control means of a motor vehicle, the combination with a clutch control member, a brake control member and an engine speed control member, of a single operating member adapted to be moved into position opposite each of said members to operate each member independently of others and to be moved to another position to operate two of said members simultaneously.

3. In a device for controlling the operation of the brakes, the clutch, and the engine speed control member, of a motor vehicle, the combination with a clutch control member, a brake control member and an engine speed control member, said members being arranged in a row adjacent each other and spaced apart, of a single operating member mounted for movement over said members along said row and adapted to be brought into engagement with any one of said members to operate the same and to span the space between adjacent members to operate two of them simultaneously.

4. In a device for controlling the operation of the several control instrumentalities of a motor vehicle, the combination with a clutch control member, a brake control member and an engine accelerator member, of a single operating member mounted for lateral swinging movement across the said several members and for movement toward said members for operating each member independently of the others and for operating adjacent members simultaneously.

5. In a motor vehicle, the combination with an engine accelerator member, a clutch operating member, and a brake operating member, said members being arranged to project through a toe board of the vehicle; of a single foot pedal mounted to be moved into position opposite each of said members and to be depressed into engagement with said member, or members opposite which it is positioned, to separately operate said members or to operate two of said members simultaneously.

6. In a motor vehicle, the combination with an engine accelerator member, a clutch operating member, and a brake operating member, said members comprising pins projecting through a toe board of the vehicle; of a single foot pedal mounted for pivotal movement toward and from said toe board and for lateral swinging movement to bring said toe portion of said pedal opposite the projecting end of any one of said pins.

7. In a motor vehicle, the combination with means for accelerating the speed of the vehicle engine, means for operating the engine clutch and means for operating the vehicle brakes; of a pin for operating each of said means, said pins being mounted in position to project through the toe board of the vehicle, and a single foot pedal mounted before said toe board for pivotal movement toward and from said toe board into engagement with one or more of said pins for moving the same and operating the said means, and for lateral swinging movement across the projecting ends of said pins, said pedal having heel and toe flanges to prevent the driver's foot from slipping from said pedal.

8. In a motor vehicle the combination with an engine clutch vehicle brakes, and engine speed control means, of fluid operated means for operating said clutch, separate fluid operated means for operating said brakes, an accelerator member mounted to project through a toe board of the vehicle and connected to said engine control means to operate the same, valvular members mounted beneath the toe board for controlling the flow of fluid to each of said fluid operated means for operating said brakes and said clutch, pins mounted on said toe board to project therethrough for operating each of said valvular members by a longitudinal movement of said pins in one direction, springs to move said pins in an opposite direction, a single foot pedal mounted for pivotal movement toward said toe board and mounted for lateral swinging movement to bring said pedal opposite the projecting end of any one of said pins, said pedal being adapted to span the space between adjacent pins to depress the two pins for operating the clutch and brakes simultaneously, and stop means for limiting the lateral swinging movement of said pedal in both directions.

ARTHUR L. CASH.